(12) United States Patent
Nord, Jr. et al.

(10) Patent No.: US 8,398,144 B2
(45) Date of Patent: Mar. 19, 2013

(54) LONGITUDINAL ADJUSTMENT DEVICE

(75) Inventors: Richard O. Nord, Jr., Jemison, AL (US); Antal Teer, Millbrook, AL (US)

(73) Assignee: C. Rob Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 12/896,677

(22) Filed: Oct. 1, 2010

(65) Prior Publication Data
US 2012/0080902 A1    Apr. 5, 2012

(51) Int. Cl.
*B60N 2/07*    (2006.01)
*B60N 2/08*    (2006.01)

(52) U.S. Cl. .................. 296/65.13; 296/65.14
(58) Field of Classification Search ......... 296/65.13, 296/65.14, 68.1; 297/344.11; 248/429, 430
See application file for complete search history.

(56) References Cited

U.S. PATENT DOCUMENTS

| | | | |
|---|---|---|---|
| 4,818,022 A | 4/1989 | Nishimura | |
| 6,341,819 B1 * | 1/2002 | Kojima et al. | 297/341 |
| 6,869,057 B2 * | 3/2005 | Matsumoto et al. | 248/430 |
| 7,000,880 B2 * | 2/2006 | Jaudouin | 248/429 |
| 7,318,573 B2 * | 1/2008 | Yamada et al. | 248/424 |
| 7,328,877 B2 * | 2/2008 | Yamada et al. | 248/430 |
| 7,503,614 B2 * | 3/2009 | Yamada et al. | 296/65.13 |
| 7,600,802 B2 * | 10/2009 | Kojima | 296/65.13 |
| 7,604,214 B2 * | 10/2009 | Kojima et al. | 248/430 |
| 7,614,597 B2 * | 11/2009 | Matsumoto et al. | 248/429 |
| 7,637,469 B2 * | 12/2009 | Yamada et al. | 248/430 |
| 7,735,798 B2 * | 6/2010 | Kojima | 248/429 |
| 7,789,368 B2 * | 9/2010 | Yamada et al. | 248/430 |
| 2005/0184550 A1 * | 8/2005 | Jung et al. | 296/65.13 |
| 2006/0214460 A1 * | 9/2006 | Kojima | 296/65.13 |
| 2006/0226328 A1 * | 10/2006 | Matsumoto et al. | 248/429 |
| 2008/0084085 A1 * | 4/2008 | Mizuno et al. | 296/65.13 |
| 2008/0238127 A1 * | 10/2008 | Kojima et al. | 296/65.13 |

* cited by examiner

*Primary Examiner* — Glenn Dayoan
*Assistant Examiner* — Gregory Blankenship
(74) *Attorney, Agent, or Firm* — Flaster/Greenberg PC

(57) ABSTRACT

The invention relates to a longitudinal adjustment device of a motor vehicle seat, comprising a stationary bottom rail connectable to a motor vehicle and a seat rail connectable to the vehicle seat and longitudinally displaceably supported on the bottom rail between a front and a rear end position. In order to provide a longitudinal adjustment device which protects the seat rail against a crash-induced displacement with respect to the bottom rail in the area of its rear end position, it is provided that the detachment lock in effective connection with the bottom rail and the seat rail in the area of their rear end position is formed in such a manner that it blocks a crash-induced separation of the seat rail from the bottom rail.

13 Claims, 2 Drawing Sheets

LONGITUDINAL ADJUSTMENT DEVICE

BACKGROUND OF THE INVENTION

1. Field of the Invention

The invention relates to a longitudinal adjustment device of a motor vehicle seat, comprising:
- stationary bottom rail connectable with a motor vehicle,
- seat rail connectable with the motor vehicle seat and longitudinally displaceably supported on the bottom rail between a front and a rear end position.

2. Description of Related Art

Longitudinal adjustment devices of the initially mentioned type serve to arrange a vehicle seat on a floor assembly of a motor vehicle in a longitudinally displaceable manner. The seat rail connectable to the vehicle seat is longitudinally displaceably supported by the bottom rail connectable to the vehicle floor, so that adjustment of the vehicle seat between a front and a rear position is carried out by adjusting the seat rail between the associated front and rear end positions. The rails of a longitudinal adjustment device are only in contact in guiding areas by means of suitable sliding and/or rolling bodies and are otherwise spaced from each other.

In the case of a crash and the attendant accelerations, it is necessary for the seat rail to be reliably arranged on the bottom rail so that the tensile forces acting on the seat rail due to the crash are reliably transferred to the bottom rail. In particular if a seatbelt lock is arranged on the seat rail, increased acceleration forces act on the seat rail in the case of a crash, the intensity of which also depends on the position of the seat rail with respect to the bottom rail, whereby the highest loads occur if the seat rail is arranged in the area of its rear end position. To guarantee the safety function of the vehicle seat, it must be prevented as far as possible in each seat position that the two rails separate due to the applied loads, for example tear apart in the manner of a zip fastener.

Prior art longitudinal adjustment devices of the initially mentioned type have a U-shaped cross section to achieve a resistance against separation or tearing apart of the rails, wherein the free ends in the cross section of the rails are configured in such a manner that they are in hooked engagement. To achieve sufficient tear resistance for all positions of the seat rail with respect to the bottom rail it is necessary, however, to design the seat rail and the bottom rail under consideration of the highest loads to be expected, whereby the load situation in the case where the seat rail is arranged in the area of the rear end position is to be considered, in particular, since in this position particularly high acceleration forces act on the seat rail of the longitudinal adjustment device in the case of a crash.

In view of the above, it is the object of the present invention to provide a longitudinal adjustment device which protects the seat rail in the area of its rear end position to the greatest possible extent against crash-induced displacement with respect to the bottom rail.

The invention achieves the object by a longitudinal adjustment device having the features of claim 1. Advantageous embodiments of the invention are the subject matter of the dependent claims.

BRIEF SUMMARY OF THE INVENTION

A characterizing feature of the longitudinal adjustment device of the present invention is a detachment lock in effective connection with both the bottom rail and the seat rail in the area of the rear end position of the seat rail. The detachment lock is dimensioned such that it fixes the seat rail in the area of its rear end position on the bottom rail in the Z axis direction in addition to the positional locking effect of the seat rail resulting from the linear guiding effect of the seat rail on the bottom rail, and blocks to the largest extent, or considerably hinders, detachment of the seat rail from the bottom rail. In the context of the present application, the Z axis direction is the vertical axis of the vehicle with respect to the installation position of the longitudinal adjustment device in the vehicle. Fixing of the seat rail on the bottom rail by means of the detachment lock is only in the area around the rear end position of the seat rail, since, in this position of the seat rail with respect to the bottom rail, particularly high acceleration forces act on the longitudinal adjustment device in the case of a crash, applied, for example, by the seatbelt lock arranged on the seat rail.

The configuration of the longitudinal adjustment device according to the present invention thus enables the seat rail and the bottom rail to be dimensioned without considering the load peaks in the case of an arrangement of the seat rail in the area around the rear end position. The active area of the detachment lock, i.e. the area in which it is in effective connection with the bottom rail and the seat rail and hinders, or prevents, displacement in the Z axis direction, such as tearing-apart, in the case of a crash, can be freely selected, so that the bottom rail and the seat rail can be dimensioned under consideration of the adjustable effective area of the detachment lock.

The configuration of the longitudinal adjustment device according to the present invention further guarantees reliable positional locking of the seat rail on the bottom rail by means of the detachment lock, even in the case where the seat rail protrudes beyond the rear end of the bottom rail in the area of its rear end position, even though, in the case of a crash, because of the possible moment application due to the protruding position, the connection between the seat rail and the bottom rail is subject to particularly high stress. The detachment lock thus makes a cheap and material-saving configuration of the longitudinal adjustment device possible, wherein the detachment lock itself can be simply and cheaply realized and reliably blocks, or hinders, tearing-apart of the longitudinal adjustment device in the case of a crash. Since the detachment lock allows the longitudinal adjustment device to be dimensioned without taking load peaks into account, the latter can be manufactured more cheaply than hitherto known longitudinal adjustment devices and has the additional bonus of improved tear resistance of the seat rail in the area around its rear end position.

The configuration of the detachment lock in such a manner that it is in effective connection with the bottom rail and the seat rail in the area of the rear end position of the seat rail, is basically freely selectable. According to an advantageous embodiment of the invention, the detachment lock includes, however, a locking element connected with the seat rail that can be brought into engagement with a holding element arranged on the bottom rail in the area of the rear end position of the seat rail. In the case of a crash, the locking element interacts with the holding element in such a manner that the seat rail is fixed on the bottom rail by the locking element.

The engagement of the locking element on the holding element in normal operation of the longitudinal adjustment device does not necessarily mean that they have to be in contact with each other. Rather, the engagement can be of such a type that mutual support, or hooking action, is only initiated in the case where an increased acceleration acts on the seat rail due to a crash. The configuration of the detachment lock with a locking element and a holding element can be implemented in a particularly simple manner, wherein the locking element and the holding element can be freely adapted to each other in their configuration. By these means the detachment lock can be excellently adapted to the design specifications so that the longitudinal adjustment device can be flexibly produced.

An essential feature for the operation of the longitudinal adjustment device according to the present invention is that the detachment lock blocks, or essentially hinders, a displacement of the seat rail in the Z axis direction of the vehicle, i.e. in the direction of the vertical axis of the vehicle with respect to the installation position in the vehicle, so that tearing-apart, in particular, of the seat rail from the bottom rail is blocked, or at least hindered. The configuration of the locking element and the holding element for fixing the seat rail on the bottom rail is basically freely selectable. According to a particularly advantageous embodiment of the invention, however, the locking element has a stop surface reaching behind the holding element. According to this embodiment of the invention, the locking element has an area, as seen in the Z axis direction, which is in point-like, line-like, or surface contact with the holding element, or which comes into contact with the holding element in the case of a crash-induced displacement of the seat rail with respect to the bottom rail in the Z direction. Such a configuration of the locking element in a particularly reliable manner blocking or hindering of a displacement of the seat rail with respect to the bottom rail in the Z axis direction due to the accelerations arising in the case of a crash. While an overlap of the holding element and the locking element over a larger area is possible, the stop surface primarily acts in the Z axis direction and thus fulfills the function of the detachment lock in a particularly simple and reliable manner, which has otherwise no impact on the functioning of the longitudinal adjustment device, so that it does not interfere with its normal operation.

The locking element can be basically arranged on the seat rail in any desired manner. According to a particularly advantageous embodiment of the invention, however, the locking element is formed in the seat rail or of an attachment mounted on the seat rail. According to this embodiment, in which the locking element is integrally formed from the seat rail, or is formed by an attachment already installed on the seat rail, an additional component, which has to be arranged on the seat rail, can be dispensed with. This embodiment of the invention thus allows the manufacturing cost to be reduced for producing the longitudinal adjustment device in an attendant manner, wherein an additional weight-saving effect is simultaneously achieved. The attachment can be formed, for example, by a seatbelt lock carrier for a seatbelt arranged on the seat rail, wherein the seatbelt lock carrier is formed in such a manner, that in the mounted position on the seat rail, it has a portion which forms the locking element. The locking element can also be formed by cutting free and deforming a portion of the seat rail.

The arrangement of the locking element on the seat and the bottom rail can be at any desired position, as long as a cooperation is guaranteed in the area about the rear end position of the seat rail. The locking element can also extend on the outside with respect to the seat rail. According to a particularly advantageous embodiment of the invention, the locking element is formed, however, by a hook element extending into the cavity formed by the bottom rail and the seat rail, from the seat rail in the direction toward the bottom rail. A hook element can be particularly simply and cheaply manufactured and represents a particularly reliable configuration of the locking element which additionally allows a simple configuration of a holding element adapted to the hook element. An arrangement of the locking element on the inside of the cavity defined by the bottom rail and the seat rail also guarantees that no additional structural space is required in comparison to prior art longitudinal adjustment devices. Moreover, the locking element is protected against external influences in the interior of the cavity.

In case a separate locking element is used, its arrangement on the seat rail is basically freely selectable. It can be, for example, screwed or adhesively glued to the seat rail. According to a particularly advantageous embodiment of the invention, the locking element is welded to the seat rail, however, in particular by means of a butt weld. The weld connection is a connection that is simple to manufacture as well as reliable, which allows the longitudinal adjustment device to be cheaply manufactured with a separate locking element.

Just like the configuration of the locking element, the configuration of the holding element can also be freely selected, as long as it is guaranteed that the bottom rail and the seat rail are in engagement with each other by means of the locking element and the holding element in the area around the rear end position of the seat rail. The holding element can be formed, for example, when using a locking element arranged on the outside, by means of a neck protruding to the outside from the bottom rail.

According to a particularly advantageous embodiment of the invention, the holding element is formed, however, by a stud protruding from the bottom rail into the cavity. This embodiment of the invention ensures reliable cooperation of the locking element and the holding element in the interior of the cavity formed by the seat rail and the bottom rail. The stud is adapted to the locking element and can comprise, for example, at its free end, a lateral guiding surface in the form of a plate-like head. The use of a stud according to this embodiment of the invention in combination with a locking element arranged within the cavity can be particularly simply and cheaply manufactured without requiring extra structural space. Moreover, the area of cooperation is reliably protected against external influences, such as dirt.

According to a further embodiment of the invention, the holding element is part of an attachment to the bottom rail, in particular part of a mounting foot for arranging the bottom rail on the vehicle floor. According to this embodiment of the invention, an attachment arranged on the bottom rail for systematic reasons, such as an attachment foot on the bottom rail, in addition to its primary function, also fulfills the function of providing a holding element on the longitudinal adjustment device. Herein, the holding element is formed by portions of the attachment which, in the mounted position of the attachment on the bottom rail, are arranged at a position provided for the holding element. This embodiment of the invention allows a separate holding element to be dispensed with. Furthermore, a particularly reliable arrangement of the holding element on the bottom rail is ensured by means of the connection of the attachment to the bottom rail.

According to an alternative embodiment of the invention, the holding element is formed by a deformed end section of the bottom rail. According to this embodiment of the invention, the holding element is integrally formed from the bottom rail. By these means, the holding section can be formed, for example, by cutting free and deforming the end section of the bottom rail, which is formed in such a manner that it cooperates with the locking element in the area of the rear end position of the seat rail. Particularly advantageously, the end section is deformed in the direction toward the cavity, whereby a reduced structural space results for the longitudinal adjustment device.

As already explained above, it is not absolutely necessary for the creation of an engagement situation of the locking element with the holding element that the elements are in contact with each other in the course of normal operation. Rather, the holding element and the locking element can be spaced from each other in normal operation so that there is no need to provide any lubrication between them. According to a particularly advantageous embodiment of the invention, the holding element forms an end stop, however, with the locking element in the rear end position of the seat rail. According to this embodiment of the invention, the rear end position of the seat rail with respect to the bottom rail is defined by the locking element and the holding element. Separate end stops for defining the rear end position can thus be dispensed with.

According to a further embodiment of the invention, a connection area of a seatbelt lock carrier arranged on the seat rail at least partially covers the bottom rail in the rear end position of the seat rail. Depending on the design specifications with respect to the structural space available for the longitudinal adjustment device and taking the required longitudinal adjustment options into account, a configuration of the longitudinal adjustment device is possible, where the seat rail protrudes beyond the rear end of the bottom rail in its rear end position. In any case, the highest loads act on the longitudinal adjustment device in this position in the case of a crash, wherein, if a seatbelt lock is arranged by means of a seatbelt lock carrier arranged on the seat rail, an additional buckling moment acts on the seat rail in this position, if, in the rear end position of the seat rail, the force transfer area of the seatbelt lock ends in front of the rear end of the bottom rail.

This embodiment according to the present invention avoids buckling of the seat rail by providing the seatbelt lock carrier used for arranging the seatbelt lock on the seat rail with a connection area, i.e. a contact area with the seat rail, which at least partially covers the bottom rail also in the rear end position of the seat rail, i.e. is arranged, in the Z axis direction, at least with a partial area, above the bottom rail in the area of its rear end.

By means of this configuration of the invention, in which the seatbelt lock carrier can be connected with the seat rail in any desired manner, for example welded to it, it is ensured that the forces applied to the seat rail by means of the seatbelt lock due to a crash do not result in the seat rail buckling out in the area behind the rear end of the bottom rail. This configuration of the invention can also be implemented in a particularly simple and cheap manner by correspondingly configuring the length of the area over which a seatbelt lock carrier is connected with the seat rail.

BRIEF DESCRIPTION OF THE SEVERAL VIEWS OF THE DRAWING(S)

Exemplary embodiments of the invention will be explained in the following with reference to the drawings, in which.

DETAILED DESCRIPTION OF THE INVENTION

Figure 1:
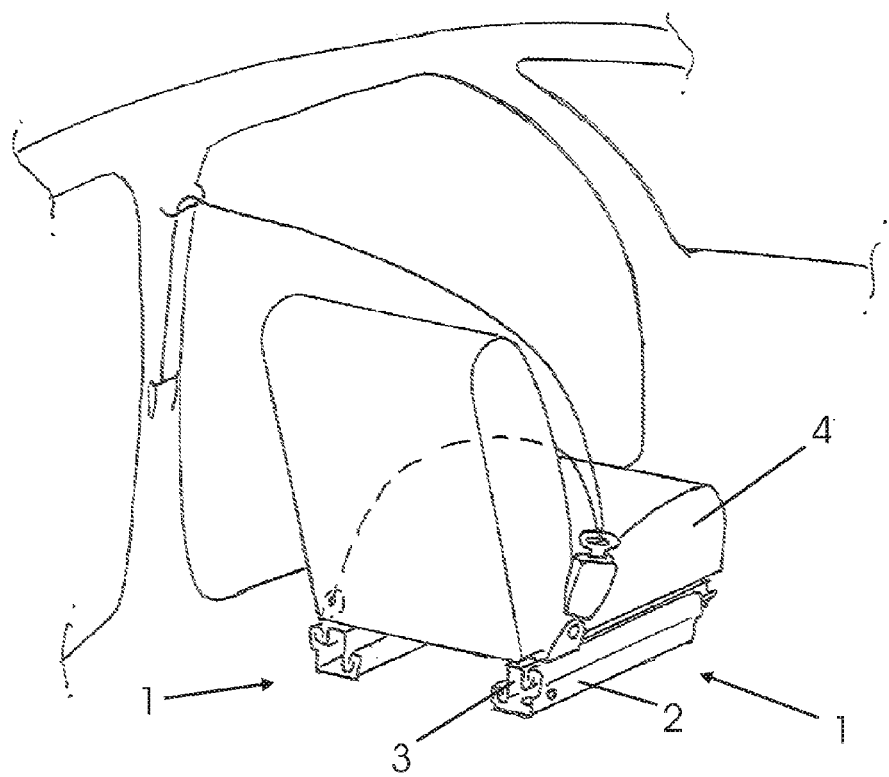
FIG. 1 is a drawing of a vehicle seat arranged in a vehicle using a longitudinal adjustment device.

FIG. 1 illustrates an arrangement of a vehicle seat 4 in a vehicle body. This is achieved by two parallel longitudinal adjustment devices 1 arranged at a distance from each other, each comprising a bottom rail 2 arranged on the vehicle floor and a seat rail 3 arranged on vehicle seat 4. Seat rail 3 is longitudinally adjustable on bottom rail 2 between front and rear end positions. This adjustability enables the position of vehicle seat 4 to be adjusted in the longitudinal direction, wherein the front end position of seat rail 3 is associated with the front-most position of vehicle seat 4 and the rear end position of seat rail 3 is associated with the rear-most position of vehicle seat 4.

Figure 4:
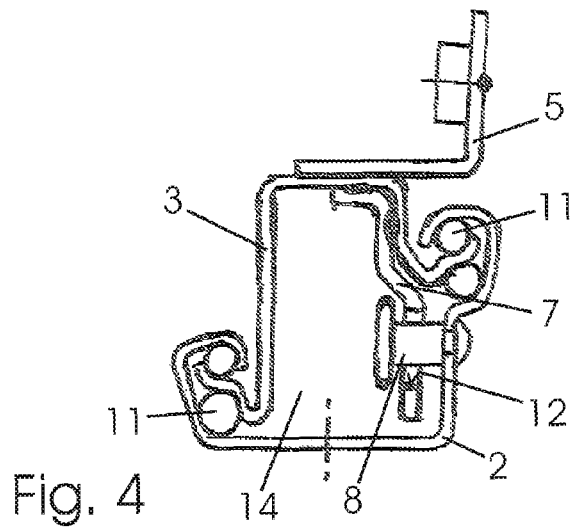
FIG. 4 is a front view of the longitudinal adjustment device of FIG. 3.

Bottom rail 2 and seat rail 3 are formed of U-shaped bent metal sheet profiles, wherein their bending profile is such that the free ends of rails 2, 3 in cross section, are in mutual engagement, whereby seat rail 3 is essentially fixed in the Z axis direction. In the mounted state of seat rail 3 on bottom rail 2, they define a cavity 14 in the interior of longitudinal adjustment device 1 (cf. FIGS. 2 and 4).

Longitudinal adjustment of vehicle seat 4 with respect to the vehicle floor is achieved by means of a longitudinal displacement of seat rail 3 with respect to bottom rail 2, wherein they are in contact with each other via rolling bodies 11 only in certain guiding areas, by means of which seat rail 3 is fixed in the Z axis direction with respect to bottom rail 2 in the course of normal operation. In the remaining areas, bottom rail 2 and seat rail 3 are spaced from each other since they are supported on rolling elements 11.

Bottom rail 2 is adjustable with respect to seat rail 3 between the front end position and the rear end position. In the area around the rear end position a locking element 7 cooperates with a holding element 8, which together form a detachment lock 6. Locking element 7 is a component having a hook-shaped configuration, which includes an elongate stop surface 12 adapted to holding element 8. In the area around the rear end position shown in FIGS. 3 and 5 of seat rail 3, a stop surface 12, aligned in the Z axis direction, of locking element 7 reaches behind holding element 8 in the area around the rear end position of seat rail 3, so that, in case of a crash, a detachment movement of seat rail 3 with respect to bottom rail 2 is blocked, or hindered, by the cooperation of locking element 7 with holding element 8. Herein, stop surface 12 arranged at a distance from holding element 8 in normal operation comes into contact with holding element 8, whereby seat rail 3 is fixed on bottom rail 2 (cf. FIGS. 3 and 5).

Figure 3:
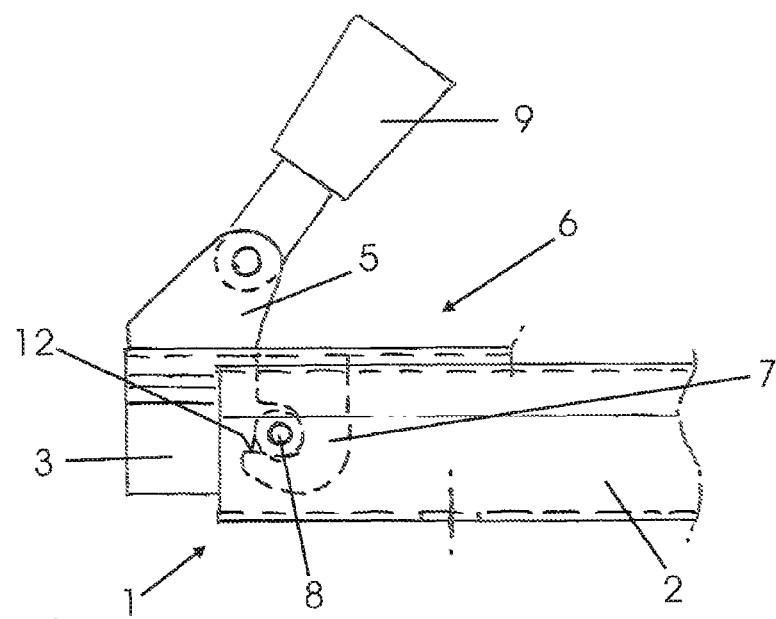
FIG. 3 is a drawing of a side view of a longitudinal adjustment device including a seatbelt lock carrier arranged on a seat rail together with a seatbelt lock.

In the rear end position shown in FIG. 3, in particular, an increased force acts on seat rail 3 in case of a crash due to the system-related rear arrangement of seat belt lock 9 on seat rail 3 via a connection element 5. In this case, detachment lock 6 ensures that the high tensile forces acting on seat rail 3 due to the crash, are particularly reliably transferred from seat rail 3 to bottom rail 2 via locking means 7 and holding element 8.

Figure 2:
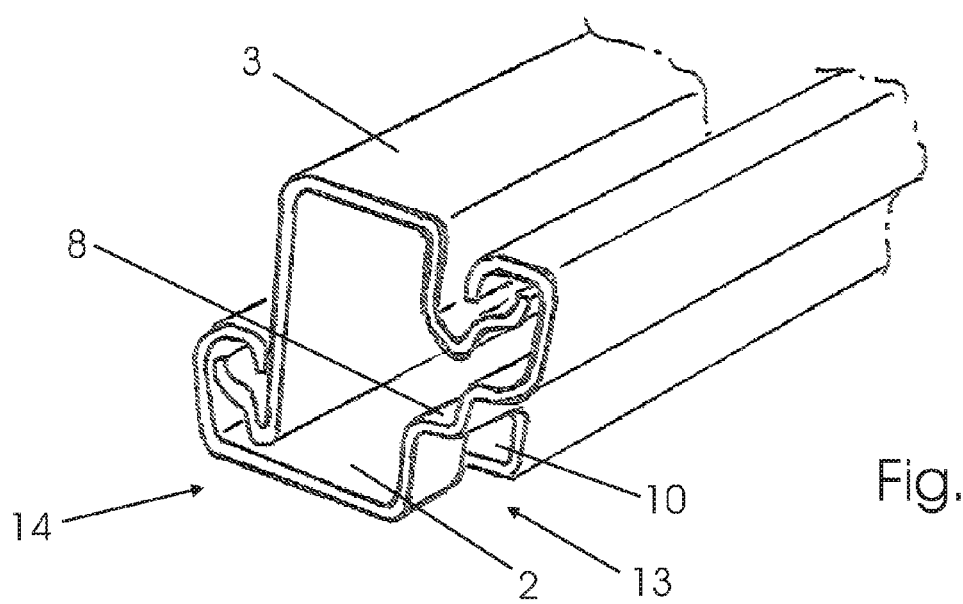
FIG. 2 is a perspective view of a rear end area of the longitudinal adjustment device of FIG. 1.
Figure 5:
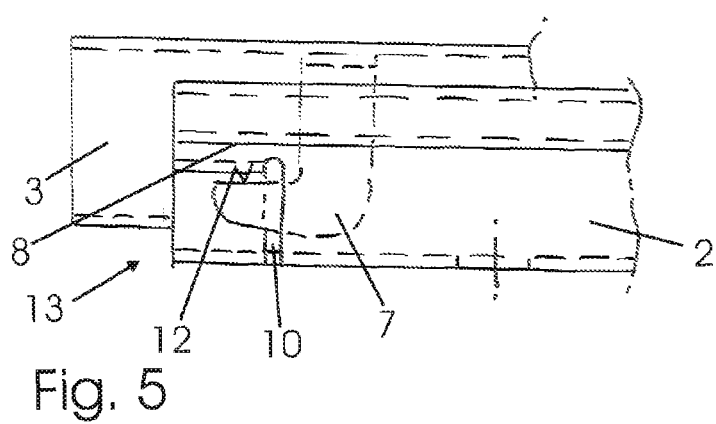
FIG. 5 is a drawing of a side view of a further embodiment of a longitudinal adjustment device.

In the exemplary embodiment shown in FIG. 3, holding element 8 is formed by a stud 8 protruding into cavity 14. An alternative embodiment of detachment lock 6 shown in FIGS. 2 and 5 provides a deformation of an end section 13 of bottom rail 2 toward cavity 14, wherein an L-shaped locking element 7 reaches through an opening 10 so that contact surface 12 is arranged outside on bottom rail 2.

The engagement area of detachment lock 6, i.e. of locking element 7 and holding element 8, is basically freely selectable, wherein an engagement area is preferably chosen, where locking element 7 cooperates with holding element 8 around the rear end position of seat rail 3 over a distance of up to 30 mm, particularly preferably up to 20 mm, i.e. fulfills the function of detachment lock 6.

We claim:

1. A longitudinal adjustment device of a motor vehicle seat, comprising a stationary bottom rail connectable to a motor vehicle, a seat rail connectable to the motor vehicle seat and longitudinally displaceably supported on the bottom rail between a front and a rear end position, characterized by a non-disengageable, permanently operable detachment lock which is protected against external influence, in effective connection with the bottom rail and the seat rail stationary positioned in the area of the rear end position of both rails, wherein the detachment lock is configured in to block a crash-induced separation of the seat rail from the bottom rail if a regular seat adjustment device of the seat has been broken during the crash.

2. The longitudinal adjustment device according to claim 1, wherein the detachment lock includes a locking element connected to the seat rail, which, in the area of the rear end position of the seat rail, can be brought into engagement with a holding element arranged on the bottom rail.

3. The longitudinal adjustment device according to claim 2, wherein the locking element comprises a stop surface reaching behind the holding element.

4. The longitudinal adjustment device according to claim 2, wherein the locking element is formed of the seat rail or of an attachment present on the seat rail.

5. The longitudinal adjustment device according to claim 2, wherein the locking element is formed by a hook element extending from the seat rail in the direction of the bottom rail in the interior of a cavity defined by the bottom rail and the seat rail.

6. The longitudinal adjustment device according to claim 2 wherein the locking element is welded to the seat rail.

7. The longitudinal adjustment device according to claim 1 wherein the holding element is formed by a stud protruding from the bottom rail into cavity defined by the bottom rail and the seat rail.

8. The longitudinal adjustment device according to claim 2, wherein the holding element is formed by a deformed end section of the bottom rail.

9. The longitudinal adjustment device according to claim 8, wherein the holding element is part of an attachment of the bottom rail.

10. The longitudinal adjustment device according to claim 8, wherein the end section is deformed in the direction towards a cavity defined by the bottom rail and the seat rail.

11. The longitudinal adjustment device according to claim 2, wherein the holding element together with the locking element forms an end stop for the rear end position of the seat rail.

12. The longitudinal adjustment device according to claim 2, wherein in the rear end position of the seat rail, a connection area, of a seat belt lock carrier arranged on the seat rail at least partially covers the bottom rail.

13. The longitudinal adjustment device according to claim 2, wherein the holding element is part of a mounting foot for arranging the bottom rail on the vehicle floor.

* * * * *